(12) United States Patent
Bedsole

(10) Patent No.: US 6,471,237 B1
(45) Date of Patent: Oct. 29, 2002

(54) WHEELED CONTAINER CART

(76) Inventor: Robert Bedsole, c/o Adcom Technologies, Inc., P.O. Box 658, Mount Prospect, IL (US) 60056

( * ) Notice: Subject to any disclaimer, the term of this patent is extended or adjusted under 35 U.S.C. 154(b) by 0 days.

(21) Appl. No.: 09/724,233

(22) Filed: Nov. 28, 2000

(51) Int. Cl.$^7$ ................................................. B62B 1/00
(52) U.S. Cl. ............... 280/655; 280/47.26; 280/47.315; 280/79.2
(58) Field of Search ................................. 280/651, 652, 280/655, 655.1, 47.17, 47.19, 47.23, 47.24, 47.25, 47.26, 47.131, 47.31, 653, 639, 40, 641, 42, 47.34, 47.35, 47.371, 79.2, 79.5, 79.7, 47.315; 248/129, 130, 98; D34/5, 12, 14

(56) References Cited

U.S. PATENT DOCUMENTS

| | | | | |
|---|---|---|---|---|
| 454,174 A | * | 6/1891 | Martin et al. ............. | 280/47.19 |
| 1,337,438 A | * | 4/1920 | Carlson .................... | 280/47.26 |
| D145,505 S | * | 9/1946 | Beidelman, Jr. ..... | 280/47.19 X |
| 2,634,933 A | * | 4/1953 | Grimsley .................... | 248/129 |
| D183,852 S | * | 11/1958 | Marcus .................. | 280/655 X |
| 2,918,295 A | * | 12/1959 | Milner ......................... | 280/40 |
| 3,017,710 A | * | 1/1962 | Carlson .................. | 280/655 X |
| 3,035,847 A | * | 5/1962 | Born ............................. | 280/40 |
| 3,463,504 A | * | 8/1969 | Petry et al. .................... | 280/40 |
| 3,751,058 A | * | 8/1973 | Larsen ......................... | 280/30 |
| 3,875,981 A | * | 4/1975 | Brenner et al. ........... | 248/98 X |
| 4,789,180 A | * | 12/1988 | Bell ........................... | 280/652 |
| 5,108,120 A | * | 4/1992 | Jamusz et al. ........... | 280/47.23 |
| 5,362,089 A | * | 11/1994 | Jyan-Tsai ................. | 280/655.1 |
| 5,845,915 A | * | 12/1998 | Wilson .................... | 280/47.19 |
| 5,915,723 A | * | 6/1999 | Austin ........................ | 280/651 |
| 6,050,576 A | * | 4/2000 | Tanner et al. ............. | 280/47.21 |

* cited by examiner

Primary Examiner—Brian L. Johnson
Assistant Examiner—Bryan Fischmann
(74) Attorney, Agent, or Firm—Lee, Mann, Smith, McWilliams, Sweeney and Ohlson

(57) ABSTRACT

A cart is disclosed for supporting and transporting a container. The cart includes a container carrier for removably receiving a container. The carrier defines a bottom support, a rear support and opposite side supports, for surrounding a bottom, a back and opposite sides of the container. Wheels are rotatably mounted to the container carrier for moving the container carrier over a ground surface. A handle is operatively associated with the container carrier for manually manipulating the container carrier over the ground surface.

16 Claims, 9 Drawing Sheets

WHEELED CONTAINER CART

FIELD OF THE INVENTION

This invention relates to a wheeled container cart and, more particularly, to an improved cart for supporting and transporting a container.

BACKGROUND OF THE INVENTION

Containers of different shapes and sizes have found widespread use for storage and transportation of materials. Containers in everyday use may range from the size of a shoebox to that of a 55 gallon drum. Depending on the size and shape of the particular container, as well as weight of the material in the container, the container can be difficult to lift and carry. Also, consideration must be given to protecting the material in the container during storage.

One example of such a container is a plastic recycling bin. These bins are generally parallelepiped in shape and are used to collect recyclable material such as newspapers, bottles, cans, jars, etc. As such, provision must be made to locate the recycling bin when not in use or while accumulating recyclable materials. Subsequently, when it is necessary to move the recycling bin, such as for curbside collection, the bin might be difficult to lift and carry due to weight or awkward size and shape.

Thus, there is a need for a device for improving the support and transporting of a container.

SUMMARY OF THE INVENTION

In accordance with the invention, there is provided an improved wheeled cart for supporting and transporting containers.

In one aspect, there is disclosed herein a cart for supporting and transporting a container. The cart includes a container carrier for removably receiving a container, in use. The carrier defines a bottom support, a rear support and opposite side supports, for surrounding a bottom, a back and opposite sides of the container, in use. Wheels are rotatably mounted to the container carrier for moving the container carrier over a ground surface. A handle is operatively associated with the container carrier for manually manipulating the container carrier over the ground surface.

It is a feature of the invention that the container carrier is of tubular metal construction.

It is another feature of the invention that the container carrier is adapted to receive multiple stacked containers, in use.

It is a further feature of the invention that the bottom support is inclined to bias the container, in use, against the rear support.

It is still a further feature of the invention that the container carrier has an open top and an open front so that the container can be inserted into or removed from the container carrier from above or in front of the cart.

It is still another feature of the invention that the handle is hingedly mounted to the carrier for pivotal movement between a folded position and an upright position. The handle comprises a pair of opposite handle arms hingedly mounted to the container carrier proximate each of the side supports and a cross member connecting upper ends of the handle arms. In the folded position the handle arms are supported on the side supports and the cross member is positioned frontwardly of the side supports so that the container can be inserted into or removed from the container carrier from above or in front of the cart with the handle in the folded position.

It is still another feature of the invention that the bottom support is spaced above the ground surface an amount related to a radius of the wheels to raise the container off of the ground surface, in use.

There is disclosed in accordance with another aspect of the invention a wheeled container cart comprising a frame for removably receiving a container, in use. The frame defines a bottom support, a rear support and opposite side supports for surrounding a bottom, a back and opposite sides of the container, in use, and an open top and an open front so that the container can be inserted into or removed from the frame from above or in front of the cart. Wheels are rotatably mounted to the frame for moving the frame over a ground surface. A handle is hingedly mounted to the frame for pivotal movement between a folded position for storage and an upright position for manually manipulating the frame over the ground surface.

It is a feature of the invention that the container carrier is of tubular construction. The side supports comprises side rails, the rear support comprises a rear cross member connected between the side rails that are rear of the frame, and the bottom support comprises lower rails. An axle shaft extends between the side rails and rotatably mounts the wheels. A front cross member is connected between the side rails at a front end of the frame. The lower rails are connected between the axle and the front cross member.

In one aspect of the invention, the rear cross member is at a higher elevation than the front cross member.

In accordance with another aspect of the invention the front cross member is at a same elevation as the axle to provide a level bottom support.

In accordance with still another aspect of the invention the front cross member is at a higher elevation than the axle to provide an inclined bottom support.

Further features and advantages of the invention will be readily apparent from the specification and from the drawings.

DETAILED DESCRIPTION OF THE INVENTION

Figure 1:
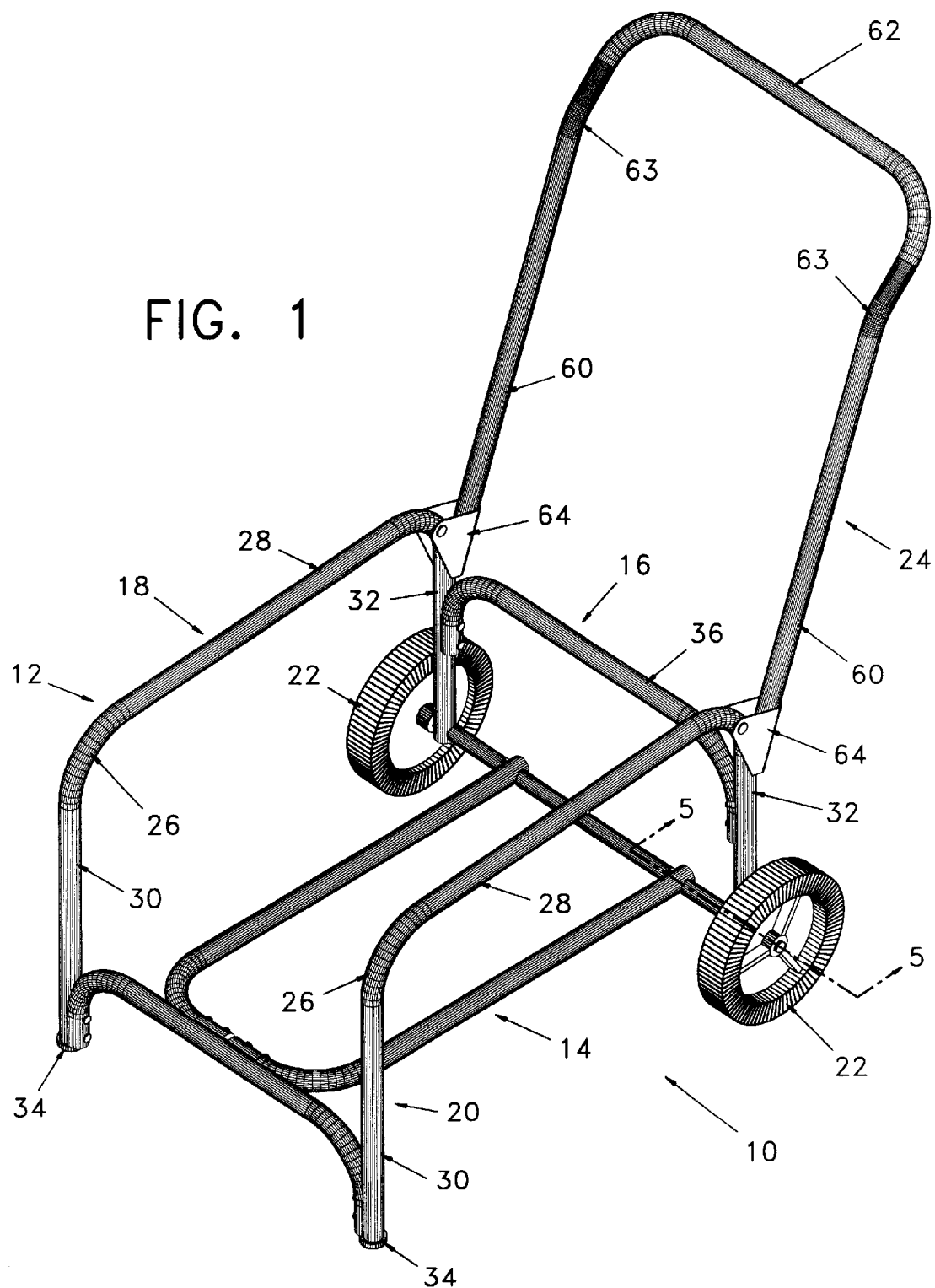
FIG. 1 is a front perspective view of a wheeled cart in accordance with the invention with a handle in an upright position.

Referring to FIG. 1, a cart 10 is illustrated for supporting and transporting a container (not shown in FIG. 1). In the illustrated embodiment of the invention, the cart 10 is adapted for supporting and transporting containers such as plastic recycling bins. However, the cart 10 may be used for transporting containers of various shapes and sizes, including, for example, plastic storage boxes, trash cans, bankers' boxes, picnic coolers, toolboxes, tubs, mail handling containers, etc.

The cart 10 includes a container carrier or frame 12 for removably receiving a container. The frame 12 includes a bottom support 14, a rear support 16 and opposite side supports 18 and 20. Wheels 22 are rotatably mounted to the frame 12 for moving the frame over a ground surface. A handle 24 is operatively connected to the frame 12, as discussed below, for manually manipulating the frame 12 over the ground surface.

In accordance with the invention, the frame 12 and handle 24 are of tubular construction. Advantageously, the frame 12 and handle 24 are of tubular steel or of tubular metal construction, although other materials may be utilized, as will be apparent.

Figure 2:
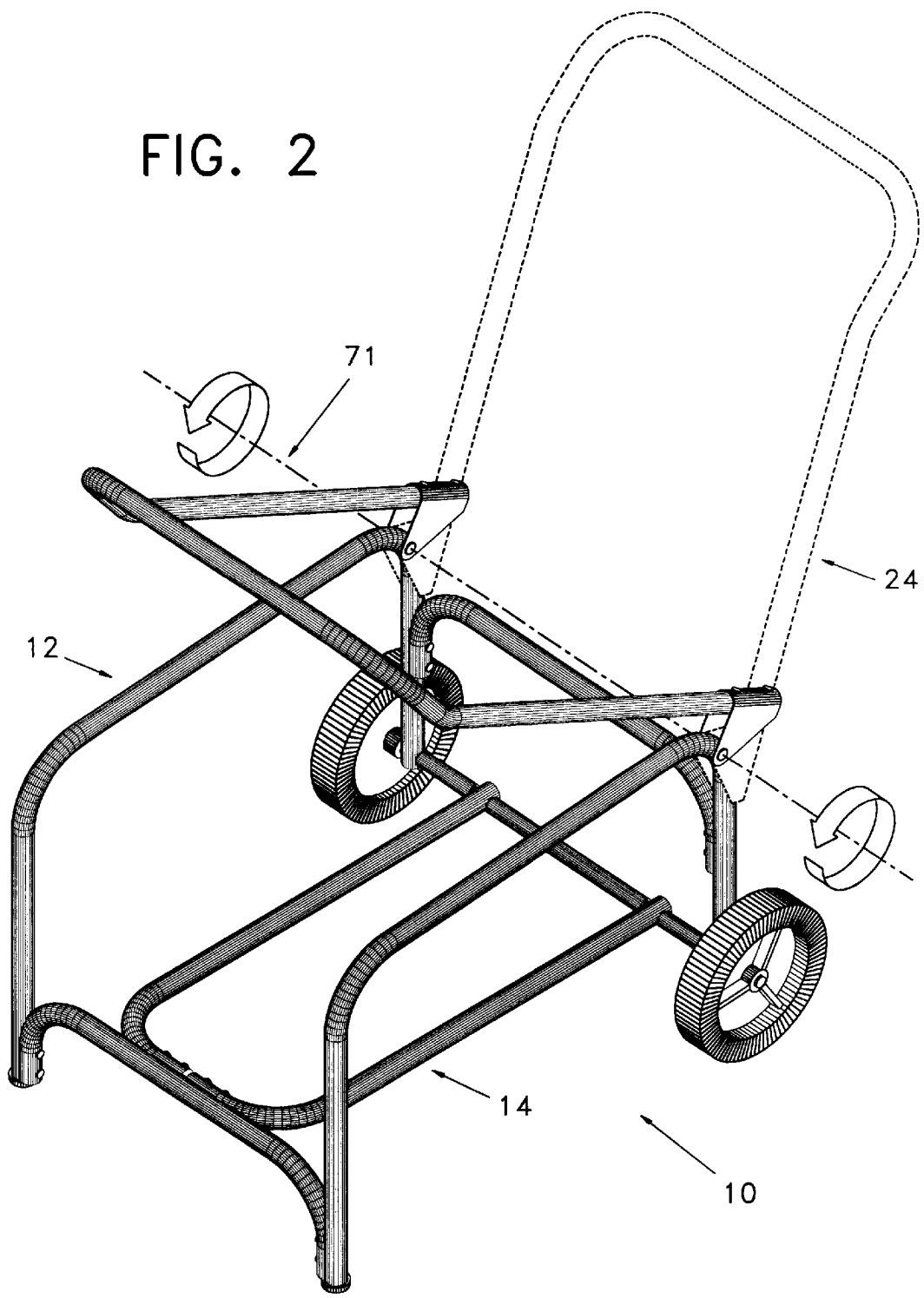
FIG. 2 is a front perspective view, similar to FIG. 1, showing movement of the handle from the upright position to a folded position.
Figure 3:
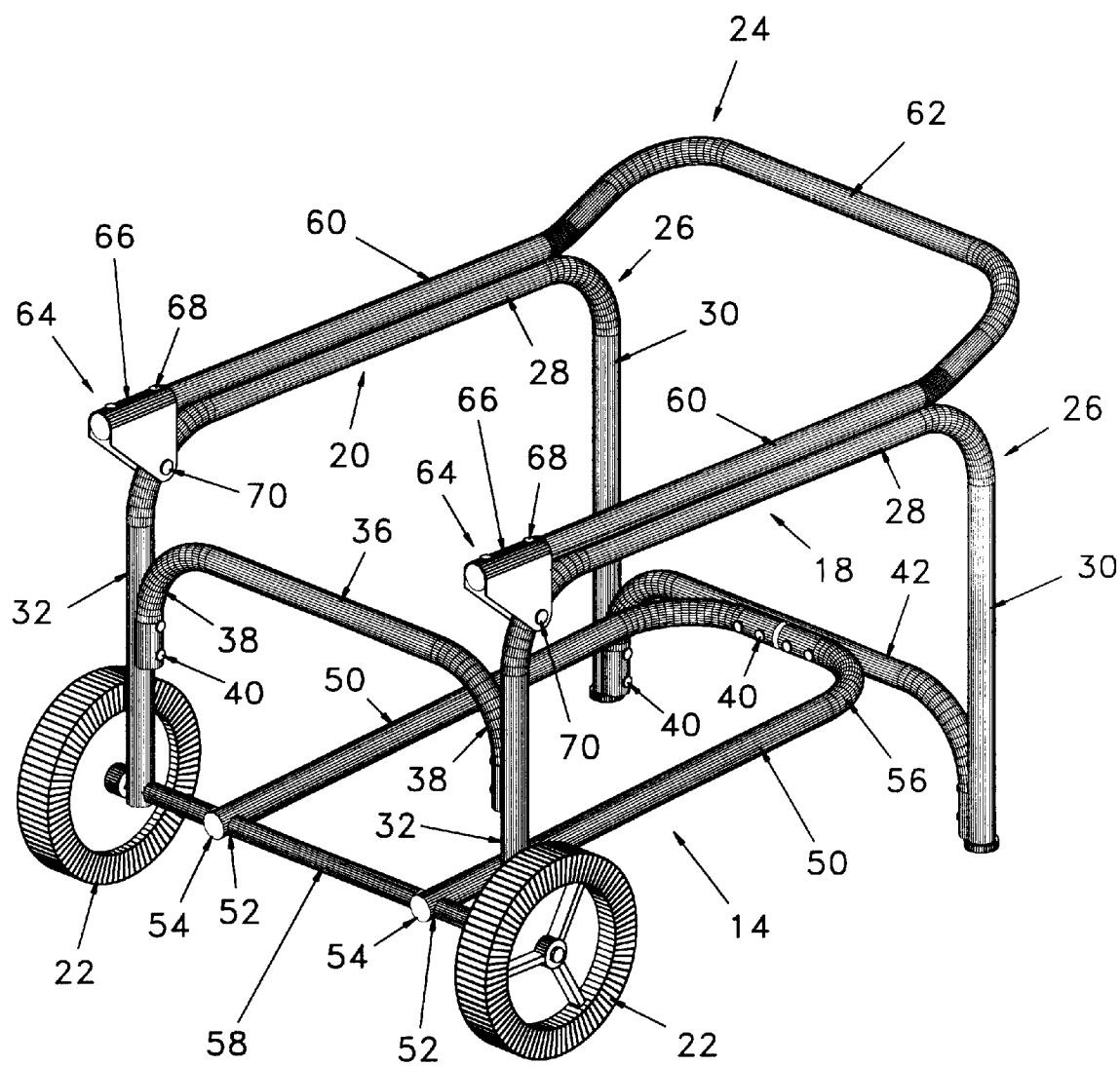
FIG. 3 is a rear perspective view of the cart of FIG. 1, showing the handle in a folded position.

Referring also to FIGS. 2 and 3, the side supports 18 and 20 comprise inverted U-shaped side rails 26. Each side rail 26 comprises a side cross member 28 connected to a downwardly depending front leg 30 and a downwardly depending rear leg 32. The front leg 30 is longer than the rear leg 32 and has a distal end covered with a plastic cap 34 for resting on the ground surface.

Figure 5:
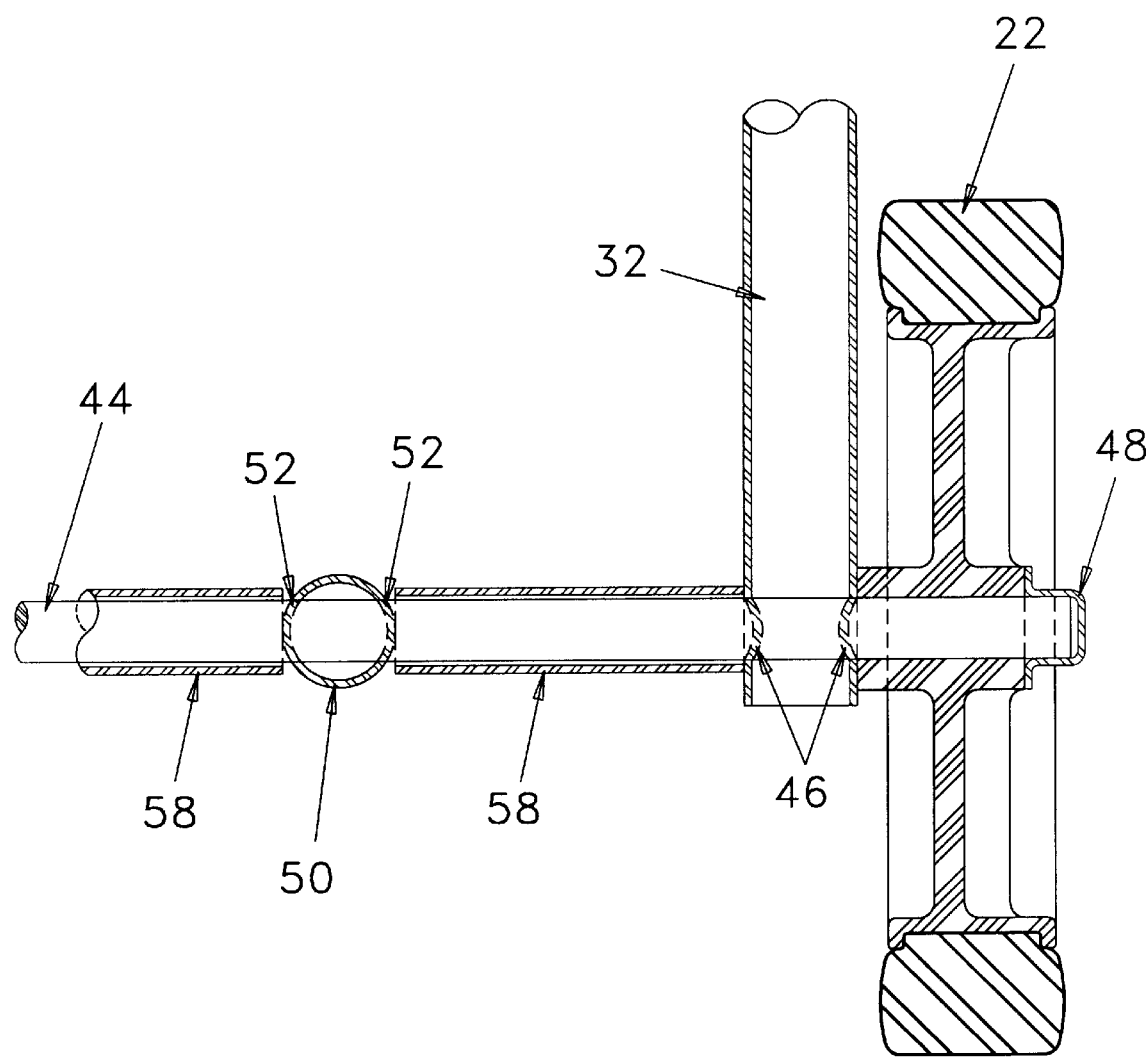
FIG. 5 is a sectional view taken along the line 5—5 of FIG. 1.

The rear support 16 comprises a rear cross member 36 having its opposite end turned downwardly as at 38 for connection using, for example, rivets 40 to the side rail rear legs 32. A similar front cross member 42 extends between and is secured to the side rail front legs 30 also with, for example, rivets 40. An axle shaft 44, see FIG. 5, extends through openings 46 in lower ends of the side rail rear legs 32. The wheels 22 are rotatably supported on the axle shaft 44 and are held thereon using push-on cap nuts 48.

The bottom support 14 comprises a pair of longitudinally extending lower rails 50. Each lower rail 50 has openings 52 proximate a rear end 54 for receiving the axle shaft 44, see FIG. 5, and an inwardly turned front end 56 connected to the front cross member 42 using, for example, rivets 40. Tubular spacers 58 are carried on the axle shaft 44 between each side rail rear leg 32 and each lower rail 50 and between the two lower rails 50. The spacers 50 maintain a desired lateral spacing between the lower rails 50 corresponding to spacing provided by connection to the front cross member 42.

The front cross member 42 is mounted to the side rail front legs 30 at a height corresponding to that of the axle 44 so that the bottom support 14 is level with a ground surface.

The handle 24 is also of tubular construction and comprises a pair of opposite handle arms 60 and an upper cross member 62 connecting upper ends of the handle arms 60. The handle is of one-piece tubular construction and is formed by bending a tube to produce the cross member 62 between the handle arms 60. The handle 24 includes rearward turned bends 63 at upper ends of the handle arms 60. Hinges 64 mount a lower end of each handle arm 60 to the side rails 28. The hinges 64 comprise saddle plates 66 fixedly mounted to the handle arms 60 using rivets 68 and pivotally mounted to the side arms 26 using hinge pins or rivets 70. As such, the handle 24 is hingedly mounted to the frame 12 for pivotal movement between an upright position, shown in FIG. 1, and a folded position shown in FIG. 3. FIG. 2 illustrates pivotal movement of the handle 24 about an axis represented by a line 71, from the upright position shown in solid line with movement at an interim position illustrated in phantom. In the folded position the handle arms 60 are supported on the side rail cross members 28 and the upper cross member 62 is positioned frontwardly of the side rails 26.

Figure 4:
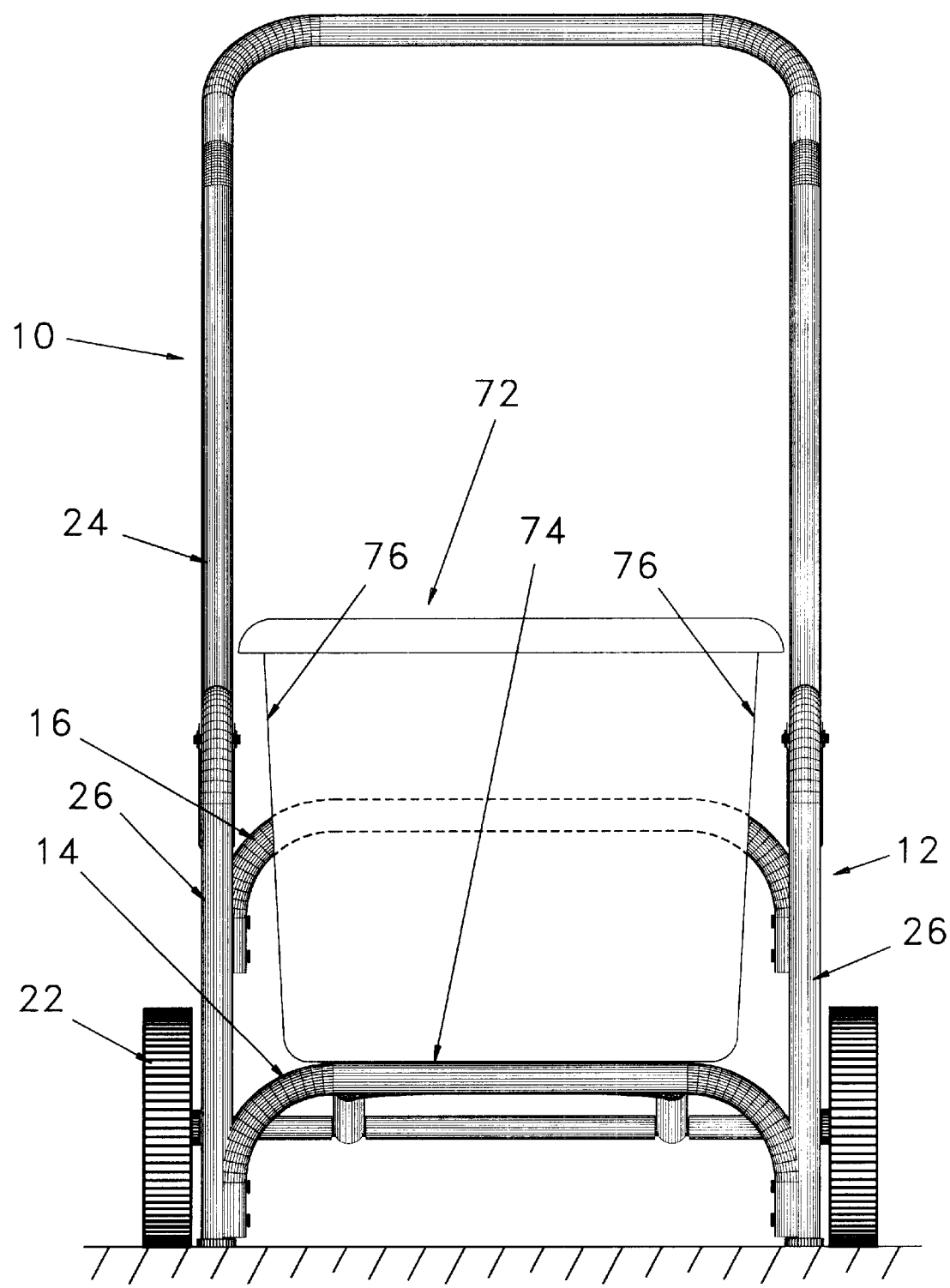
FIG. 4 is a front elevation view of the cart of FIG. 1.

Referring to FIG. 4, the cart 10 is illustrated with the handle 24 in the upright position and a container 72 in the form of a recycling bin received in the frame 12. Particularly, the container 72 includes a bottom 74 supported on the bottom support 14. Container sides 76 are supported between the side supports 26. A rear side of the container 78, see FIG. 8, is supported by the rear support 16.

Figure 6:
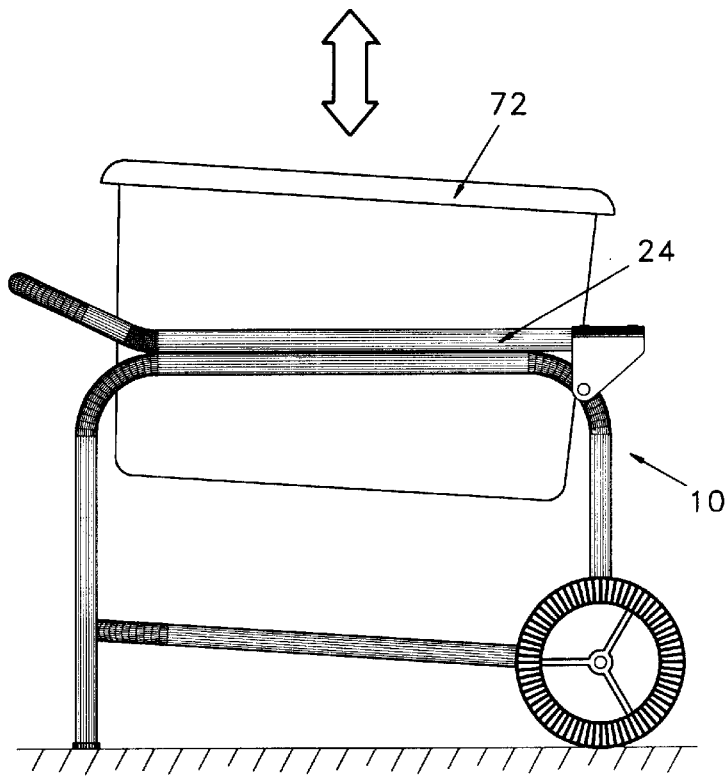
FIG. 6 is a side view illustrating inserting a bin into the cart from above the cart.
Figure 7:
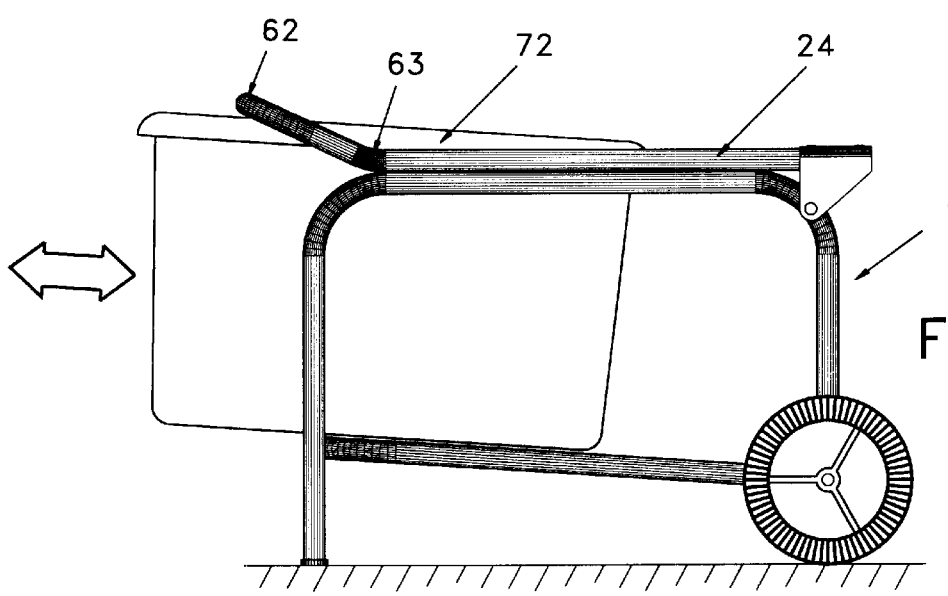
FIG. 7 is a side view, similar to FIG. 6, illustrating removing the bin from a front of the cart.

Referring also to FIGS. 6 and 7, the cart 10 is illustrated with the handle 24 in the folded position. In this position, the frame 12 has an open top and an open front so that the container 72 can be inserted into or removed from the frame 12 from above the cart, as shown in FIG. 6, or from in front of the cart, as shown in FIG. 7. Thus, in normal use, after a container 72 has been emptied, then the container 72, while it is relatively light in weight, can be inserted from the top, as shown in FIG. 6. Later, when the container 72 is full of recyclables, or other materials, thus increasing the weight of the container, the container 72 can be removed by sliding it out of the front of the cart 10, as shown in FIG. 7, rather than lifting the container 72. As can be seen the bends 63 provide sufficient vertical space of the upper cross member 62 from the bottom support 14 to allow removal of the container 72 with the handle 24 in the folded position.

In accordance with the invention, the frame 12 is adapted to surround the sides, as well as the bottom and back of the container 72, to thereby retain objects that would otherwise tend to slide off of conventional handcarts that contact only the bottom and the back of the objects carried thereon.

Figure 8:
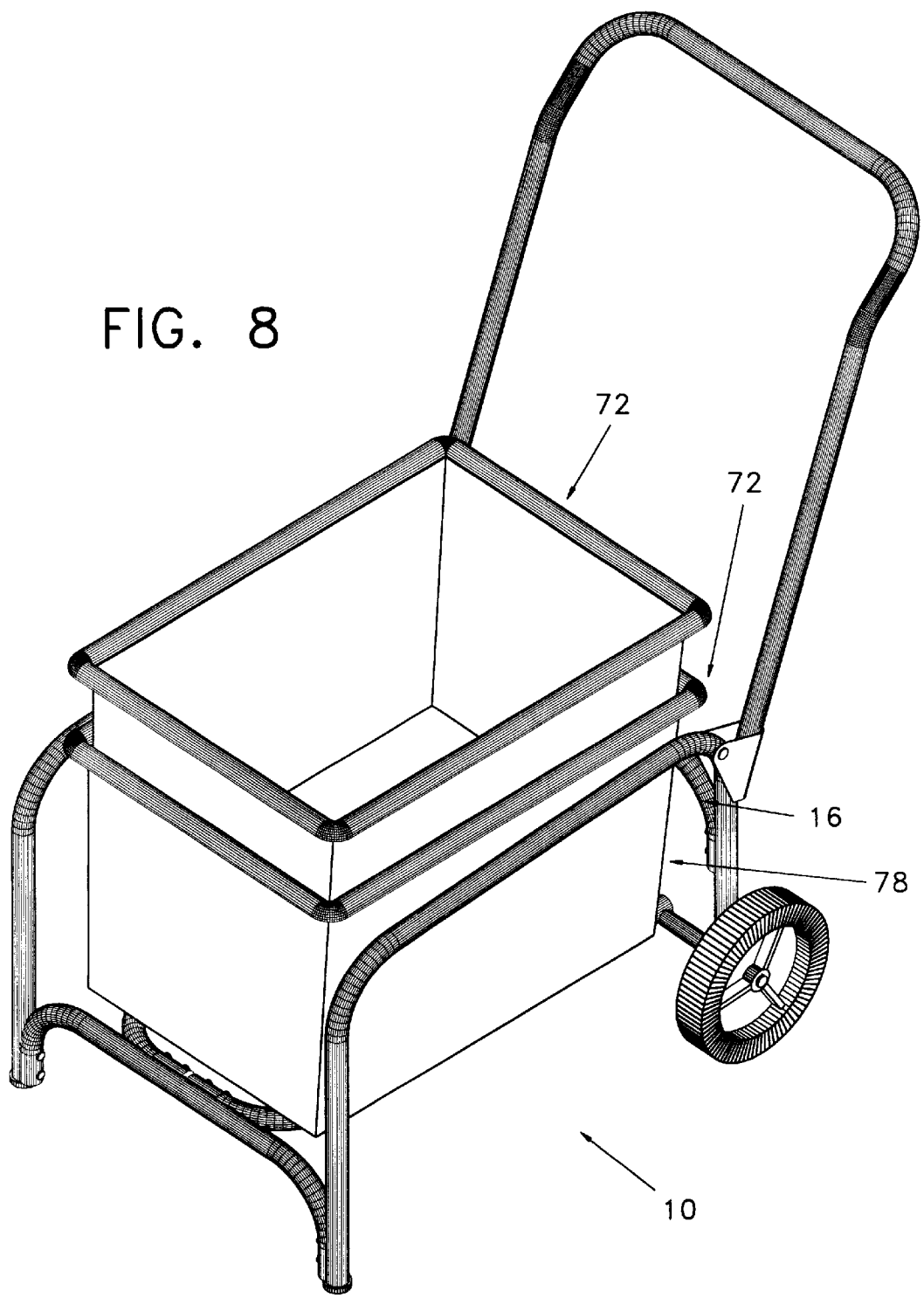
FIG. 8 is a perspective view of the cart of FIG. 1 illustrating multiple containers stacked or nested in the cart.

Referring to FIG. 8, the design of the carts 10 is such that nested or stacked containers 72 can be stored and transported on the cart 10.

Figure 9:
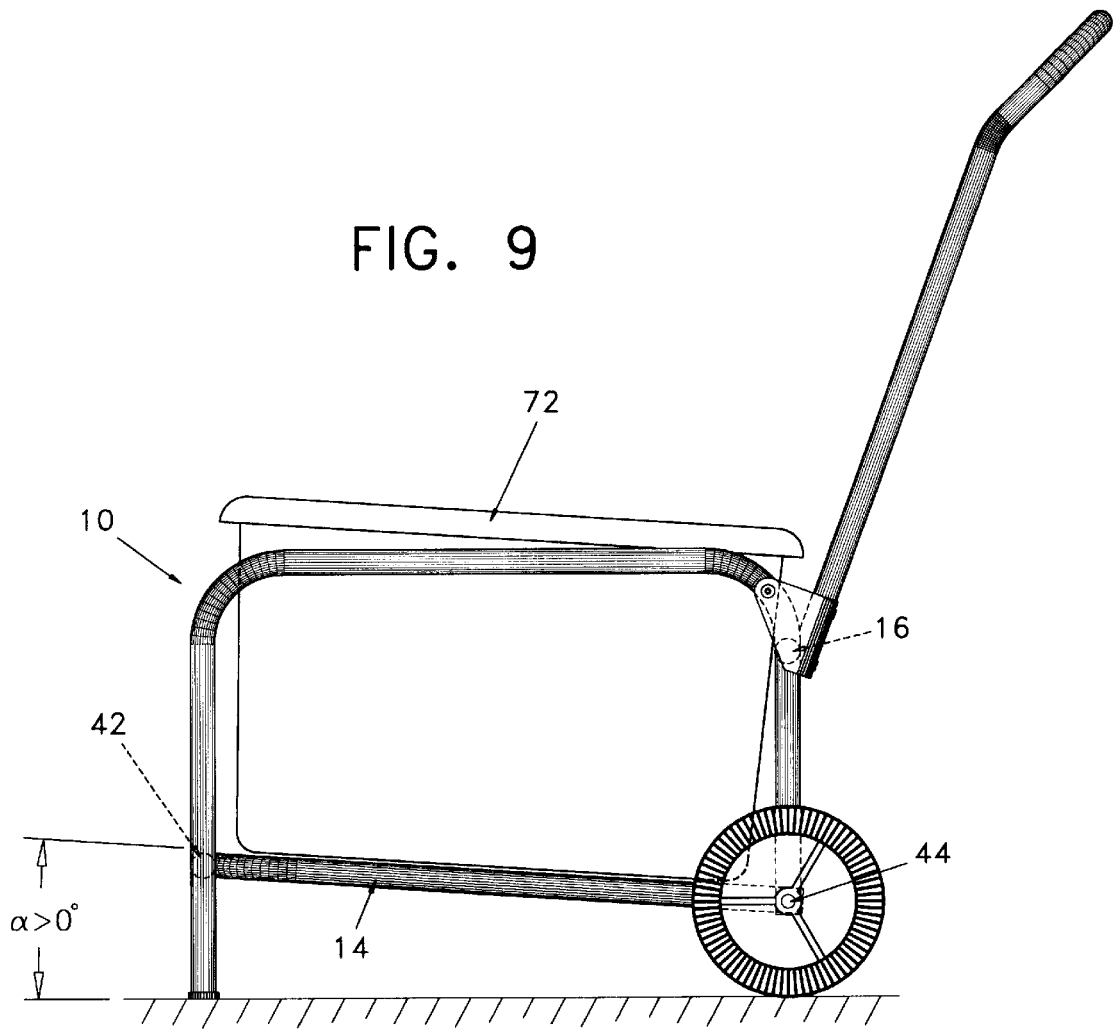
FIG. 9 is a side view illustrating a cart in accordance with an alternative embodiment of the invention having an inclined bottom support.

Referring to FIG. 9, a cart 10' according to an alternative embodiment of the invention is illustrated. In the alternative embodiment, the front cross member 42 is mounted at a higher elevation than the axle shaft 44. As a result, the bottom support 14 is inclined to bias the container 72 toward the rear support 16 to help retain the container 72 on the cart 10'.

The design of the cart 10 permits a cart with a container to be rolled against a wall, or into a corner of a room, when not in use or while accumulating contents in the container. With the handle 24 in the folded position, the cart 10 and container 72 together take up substantially the same floor space as the container 72 by itself Moreover, the cart 10 can act as a storage stand for the container 72 by raising the container off of the floor or ground. This protects the contents from water damage, etc. The plastic or rubber protective caps 34 protect the floor surfaces from nicks and scratches and the like.

While the cart 10 is illustrated to be of tubular construction, the cart 10 could utilize other materials such as, for example, plate material or the like. Likewise, the various components could be secured by screws, welds, or other fastening devices.

Figure 10:
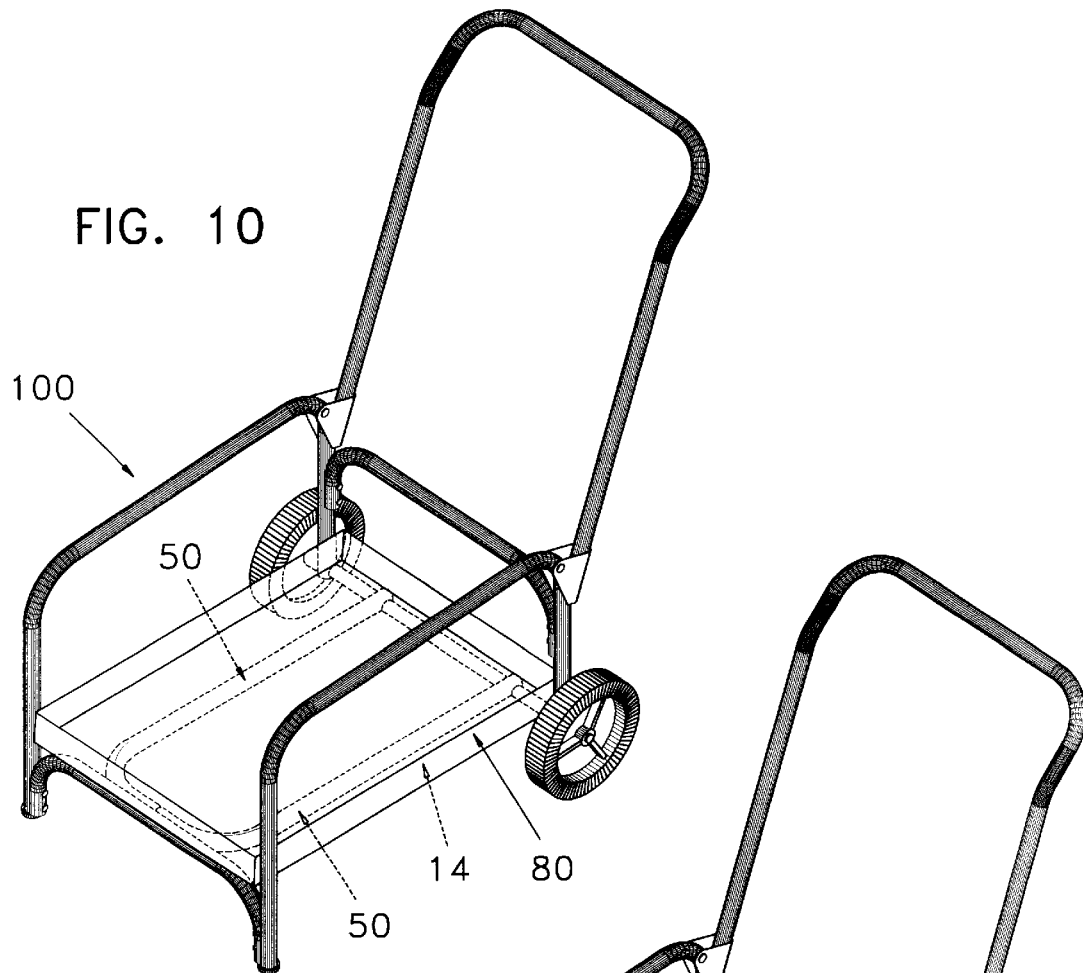
FIG. 10 is a perspective view similar to FIG. 1 illustrating a cart in accordance with another alternative embodiment of the invention.

Referring to FIG. 10, there is illustrated a cart 100 in accordance with another embodiment of the invention. The cart 100 is generally similar to the cart 10 discussed above and differs in including a tray 80 on the lower support rails 50. The tray 80 may be secured by any known means to the support rails 50. Alternatively, the tray 80 may completely replace the lower support rails 50. The tray 80 could be constructed in various configurations and of various materials including, for example, wood, plastic, sheet metal or grating, with or without raised edges to selectively help retain cargo on the cart 100.

Figure 11:
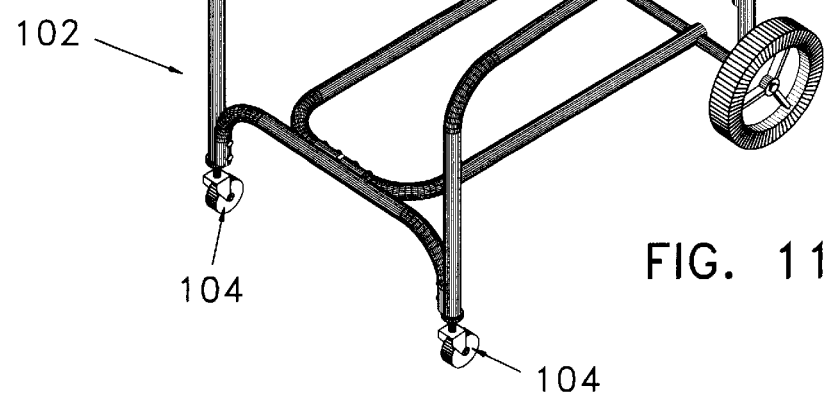
FIG. 11 is a perspective view similar to FIG. 1 illustrating a cart in accordance with yet another alternative embodiment of the invention.

Referring to FIG. 11, a cart 102 in accordance with yet another embodiment of the invention is illustrated. The cart 102 is generally similar to the cart 10 discussed above, except that the plastic caps 34 on the front legs 30, see FIG. 1, are replaced with caster wheels 104. The caster wheels 104 provide for increased versatility and ease of handling.

Thus, in accordance with the invention, there is described a wheeled container cart for supporting and transporting containers.

I claim:

1. A cart for supporting and transporting a container comprising:
   a frame having a front portion and a rear portion, said frame including base members adapted to support the container;
   an axle located at said rear portion of said frame and connected to said base members, said axle including wheels;
   a pair of side rails pivotally connected to said axle at a first end and adapted to support said cart at a second end;
   a rear member connected at said rear portion of said frame, said rear member adapted to prevent rearward movement of the container during transport;
   a passageway located at said front portion of said frame between said side rails and opposite said rear member, said passageway allowing for the generally horizontal ingress and egress of the container from said cart;
   a handle having handle side members interconnected by a handle cross member, said handle is hingedly mounted to said side rails at said rear portion for pivotal movement between a folded position and an upright position; and
   said handle cross member is positioned so that when said handle is in said folded position the container can be removed vertically or generally horizontally from said cart.

2. The cart of claim 1, wherein said frame is of a tubular construction.

3. The cart of claim 1, wherein said base members are inclined to bias the container, against said rear member.

4. The cart of claim 1, wherein said axle includes spacers disposed about said axle, said spacers are adapted to maintain a desired lateral spacing between said base members and between said side rails.

5. The cart of claim 1, wherein said side rails include apertures that allow for the passage of said axle.

6. The cart of claim 1, further comprising a front member adapted to connect to said side rails to said base members.

7. The cart of claim 1, wherein said side rails terminate at said front portion of said frame with legs extending downward to contact the ground, said legs providing stable and level support of the container when not being transported.

8. A container support cart comprising:
   a base member adapted to support a container;
   an axle connected to said base member at a first end, said axle including wheels;
   a pair of side rails connected to said axle at a first end and adapted to support said cart at a second end, said side rails are adapted to retain the container on said base member and are oriented to create openings to allow for vertical and generally horizontal ingress and egress of the container from said cart;
   a rear support member disposed substantially over said axle and adapted to retain the container on said base member;
   a handle having handle side members interconnected by a handle cross member, said handle is hingedly mounted to said side rails for pivotal movement between a folded position and an upright position; and,
   said handle when in said folded position does not obstruct the vertical or generally horizontal ingress and egress of the container from said cart.

9. The container support cart of claim 8, wherein said cart is of a tubular construction.

10. The container support cart of claim 8, wherein said base member is inclined to bias the container, against said rear support, member.

11. The container support cart of claim 8, wherein said axle includes spacers disposed about said axle, said spacers are adapted to maintain a desired lateral spacing between said base member and said side rails.

12. The container support cart of claim 8, wherein said side rails include apertures that allow for the passage of said axle.

13. The container support cart of claim 8, further comprising a front member adapted to connect to said side rails to said base member.

14. The container support cart of claim 8, wherein said side rails terminate at said second end with legs extending downward to contact the ground, said legs providing stable and level support of the container when not being transported.

15. The container support cart of claim 8, wherein said second end of said side rails include wheels.

16. The container support cart of claim 8, wherein said base member is comprised of a tray.

* * * * *